US008098292B2

(12) United States Patent
Hosoda

(10) Patent No.: US 8,098,292 B2
(45) Date of Patent: Jan. 17, 2012

(54) METHOD OF CAPTURING STILL IMAGE DURING CAPTURE OF MOVING IMAGE AND IMAGE CAPTURE APPARATUS

(75) Inventor: Jun Hosoda, Hanno (JP)

(73) Assignee: Casio Computer Co., Ltd., Tokyo (JP)

( * ) Notice: Subject to any disclaimer, the term of this patent is extended or adjusted under 35 U.S.C. 154(b) by 357 days.

(21) Appl. No.: 12/509,975

(22) Filed: Jul. 27, 2009

(65) Prior Publication Data
US 2009/0290035 A1 Nov. 26, 2009

Related U.S. Application Data

(62) Division of application No. 11/232,778, filed on Sep. 22, 2005, now abandoned.

(30) Foreign Application Priority Data

Sep. 29, 2004 (JP) ................................ 2004-283113
Feb. 28, 2005 (JP) ................................ 2005-052333
Mar. 25, 2005 (JP) ................................ 2005-087711
Mar. 25, 2005 (JP) ................................ 2005-087712

(51) Int. Cl.
H04N 5/225 (2006.01)
H04N 5/262 (2006.01)
(52) U.S. Cl. ................................ 348/220.1; 348/240.99
(58) Field of Classification Search ............... 348/220.1, 348/240.99, 240.3, 231.9, 333.12, 333.02, 348/211.9; 396/77, 85
See application file for complete search history.

(56) References Cited

U.S. PATENT DOCUMENTS

| 7,268,818 | B2 * | 9/2007 | Karasawa ..................... 348/360 |
| 7,362,966 | B2 * | 4/2008 | Uchiyama ................ 348/240.99 |
| 2004/0095473 | A1 * | 5/2004 | Park ........................... 348/220.1 |
| 2006/0023091 | A1 * | 2/2006 | Uchiyama ................. 348/240.1 |

FOREIGN PATENT DOCUMENTS

| JP | 10-322586 A | 12/1998 |
| JP | 11-055617 A | 2/1999 |
| JP | 11-088731 A | 3/1999 |
| JP | 11-177861 A | 7/1999 |
| JP | 11-187299 A | 7/1999 |

(Continued)

OTHER PUBLICATIONS

Japanese Office Action dated Nov. 25, 2008 and English translation thereof issued in counterpart Japanese Application No. 2005-087711.

(Continued)

Primary Examiner — Nhan T Tran
(74) Attorney, Agent, or Firm — Holtz, Holtz, Goodman & Chick, PC

(57) ABSTRACT

According to an electronic camera capable of capturing a still image during capturing of a moving image, by storing the zoom lens position information at that time when capturing of the moving image is temporarily stopped for capturing of the still image and using the field angle information or the like recorded after capturing of the still image is terminated, the zoom lens can be automatically returned to the original zoom position so as to prevent the generation of an uncomfortable feeling between the moving image before capturing of the still image and the moving image of which capturing is restarted just after termination of the still image capturing.

15 Claims, 11 Drawing Sheets

FOREIGN PATENT DOCUMENTS

| | | |
|---|---|---|
| JP | 11-187387 A | 7/1999 |
| JP | 2000-165737 A | 6/2000 |
| JP | 2000-312329 A | 11/2000 |
| JP | 2001-111934 A | 4/2001 |
| JP | 2001-352482 * | 12/2001 |
| JP | 2001-352482 A | 12/2001 |
| JP | 2002-008041 A | 1/2002 |
| JP | 2003-255442 A | 9/2003 |
| JP | 2004-104463 A | 4/2004 |
| JP | 2004-179708 A | 6/2004 |

OTHER PUBLICATIONS

Japanese Office Action dated Nov. 25, 2008 and English translation thereof issued in counterpart Japanese Application No. 2005-087712.

Japanese Office Action dated Nov. 25, 2008 and English translation thereof issued in counterpart Japanese Application No. 2005-052333.

* cited by examiner

METHOD OF CAPTURING STILL IMAGE DURING CAPTURE OF MOVING IMAGE AND IMAGE CAPTURE APPARATUS

CROSS-REFERENCE TO RELATED APPLICATIONS

The present application is a Divisional application of U.S. application Ser. No. 11/232,778 filed Sep. 22, 2005 now adandoned, which is based upon and claims the benefit of priority from prior Japanese Patent Applications No. 2004-283113, filed Sep. 29, 2004; No. 2005-052333, filed Feb. 28, 2005; No. 2005-087711, filed Mar. 25, 2005; and No. 2005-087712, filed Mar. 25, 2005, the entire contents of all of which are incorporated herein by reference.

BACKGROUND OF THE INVENTION

1. Field of the Invention

The present invention relates to an imaging technology capable of coinciding a field angle and a framing of a moving image changed by capturing of a still image upon restart of capturing of the moving image with the field angle upon capturing of the moving image before capturing of the still image after performing capturing of the still image in the middle of capturing the moving image by an image capture apparatus such as a digital camera.

2. Description of the Related Art

In the image capture apparatuses such as a digital camera, some may be provided with a moving image capturing function in addition to a normal still image capturing function and others may be provided with a voice recording function for recording the still image, the moving image, and voice simultaneously.

According to such a digital camera, normally, there are a still image capturing mode for capturing the still image and a moving image capturing mode for capturing the moving image as capturing modes to perform a mode transition by a user's operation such as the key operation.

In addition, in the digital camera, as a conventional technology when carrying out the still image capturing in the middle of the moving image capturing, a technology for capturing the still image during recording a next moving frame while capturing the moving frame at a moving frame capturing period in accordance with the capturing operation of the still image during capturing of the moving image and storing the moving frame in a buffer memory, namely, a technology for carrying out the moving image capturing processing and the still image capturing processing in parallel is proposed (for example, Jpn. Pat. Appln. KOKAI Publication No. 11-55617).

In addition, a technology to interrupt capturing of the moving frame and the recording operation thereof once upon capturing operation of the still image during the moving image capturing and restarting the capturing and recording of the moving frame after capturing and recording the still image in the meantime, namely, a technology separately producing a frame for interpolation corresponding to the moving image frame for an interruption period that cannot be recorded during capturing of the still image, storing the frame, displaying the frame for interpolation during the interruption period upon reproducing the moving image, and as a result capable of capturing the still image during capturing of the moving image has been proposed (for example, Jpn. Pat. Appln. KOKAI Publication No. 2001-111934).

However, in the case of carrying out capturing of the still image during capturing of the moving image, in many cases, the field angle and the flaming of the still image may be changed. In such a case, frequently, the field angle and the flaming of the moving that are acquired by the moving image capturing processing carried out before capturing the still image are different from those upon capturing of the moving image restarted after capturing of the still image. However, it is difficult to reproduce the field angle and the flaming upon capturing of the moving image carried out before capturing of the still image when the user changes the field angle and the flaming of the camera, so that there is a problem that a deviation is generated in the field angle and the framing of the recorded image and the user feels uncomfortable between the moving image before capturing of the moving image and the moving image just after capturing of the still image. In addition, such a problem cannot be solved by the above-described technologies described in the prior art documents.

BRIEF SUMMARY OF THE INVENTION

The present invention has been made taking the foregoing problems into consideration and an object of which is to provide an imaging technology capable of returning a field angle of a moving image changed by capturing of a still image upon restart of capturing of the moving image to the field angle before changing after performing capturing of the still image in the middle of capturing the moving image and an image capture apparatus.

In order to achieve the above-described object, the invention according to a first aspect provides a capturing method of an image capture apparatus having a moving image capturing mode for capturing a moving image and recording it in a recording memory, the method comprising: retaining field angle information upon capturing of the moving image; and switching the moving image capturing to the capturing in another capturing mode, and when the capturing is terminated, returning the field angle to that of the moving image capturing on the basis of the retained field angle information.

The invention according to a second aspect provides a capturing method of an image capture apparatus having a moving image capturing mode for capturing a moving image and recording it in a recording memory, the method comprising: retaining field angle information before switching the capturing when the capturing is switched to that in another capturing mode during capturing of the moving image; and returning the field angle to that of the moving image capturing on the basis of the retained field angle information when the capturing mode is further switched to the moving image capturing mode after carrying out the capturing in the switched capturing mode.

The invention according to a third aspect provides a capturing method of an image capture apparatus having a moving image capturing mode for capturing a moving image and recording it in a recording memory and a still image capturing mode for capturing a still image and recording it in the recording memory, the method comprising: retaining field angle information before switching the capturing when the capturing is switched to the still image capturing during capturing of the moving image; and returning the field angle to that of the moving image capturing on the basis of the retained field angle information when the still image capturing is switched to the moving image capturing.

The invention according to a fourth aspect provides a capturing method of an image capture apparatus having a moving image capturing mode for capturing a moving image and recording it in a recording memory and a still image capturing mode for capturing a still image and recording it in a recording memory, the method comprising: retaining field angle information and a parameter for capturing before switching the capturing when the capturing is switched to the still image capturing during capturing of the moving image; and returning the field angle to that of the moving image capturing on the basis of the retained field angle information and returning the capturing condition to that of the image capture apparatus upon capturing of the moving image on the basis of the retained parameter for capturing when the still image capturing is switched to the moving image capturing.

In addition, the invention according to a fifth aspect may provide the capturing method according to any one of the first to fourth aspects, characterized in that the field angle information before switching the capturing mode is the field angle information just before the capturing mode is switched during capturing of the moving mage.

In addition, the invention according to a sixth aspect may provide an image capture apparatus having a moving image capturing mode for capturing the moving image and recording it in a recording memory and comprising an imaging section for scanning an object image and producing the image data thereof; a display section for displaying the produced image data; and a recording memory for recording the image data; and further, this image capture apparatus may comprise mode switching means for switching a capturing mode; field angle information retaining means for retaining the field angle information before switching the capturing if the capturing mode is switched into another capturing mode by the mode switching means during capturing of the moving image; and field angle returning means for returning the field angle into that upon capturing of the moving image on the basis of the field angle information retained in the field angle information retaining means if the capturing in other mode is switched into the moving image capturing by the mode switching means.

In addition, the invention according to a seventh aspect provides the image capture apparatus according to the sixth aspect, wherein the field angle information retaining means may retain the field angle information just before switching the moving image capturing mode into another capturing mode and the field angle returning means may return the field angle into that just before switching the capturing mode on the basis of the field angle information.

In addition, the invention according to an eighth aspect may provide the image capture apparatus according to the sixth aspect comprising moving image capturing stopping means for stopping the moving image capturing when the mode switching means switches the moving image capturing mode into another capturing mode by the mode switching means, wherein the field angle information retaining means may retain the field angle information just before stopping the moving image capturing due to the moving image capturing stopping means and the field angle returning means may return the field angle into that just before stopping the moving image capturing on the basis of the field angle information retained by the field information retaining means.

In addition, the invention according to a ninth aspect may provide the image capture apparatus according to any one of the sixth to eighth aspects, wherein the other capturing mode is the still image capturing mode.

DETAILED DESCRIPTION OF THE INVENTION

Figure 1:
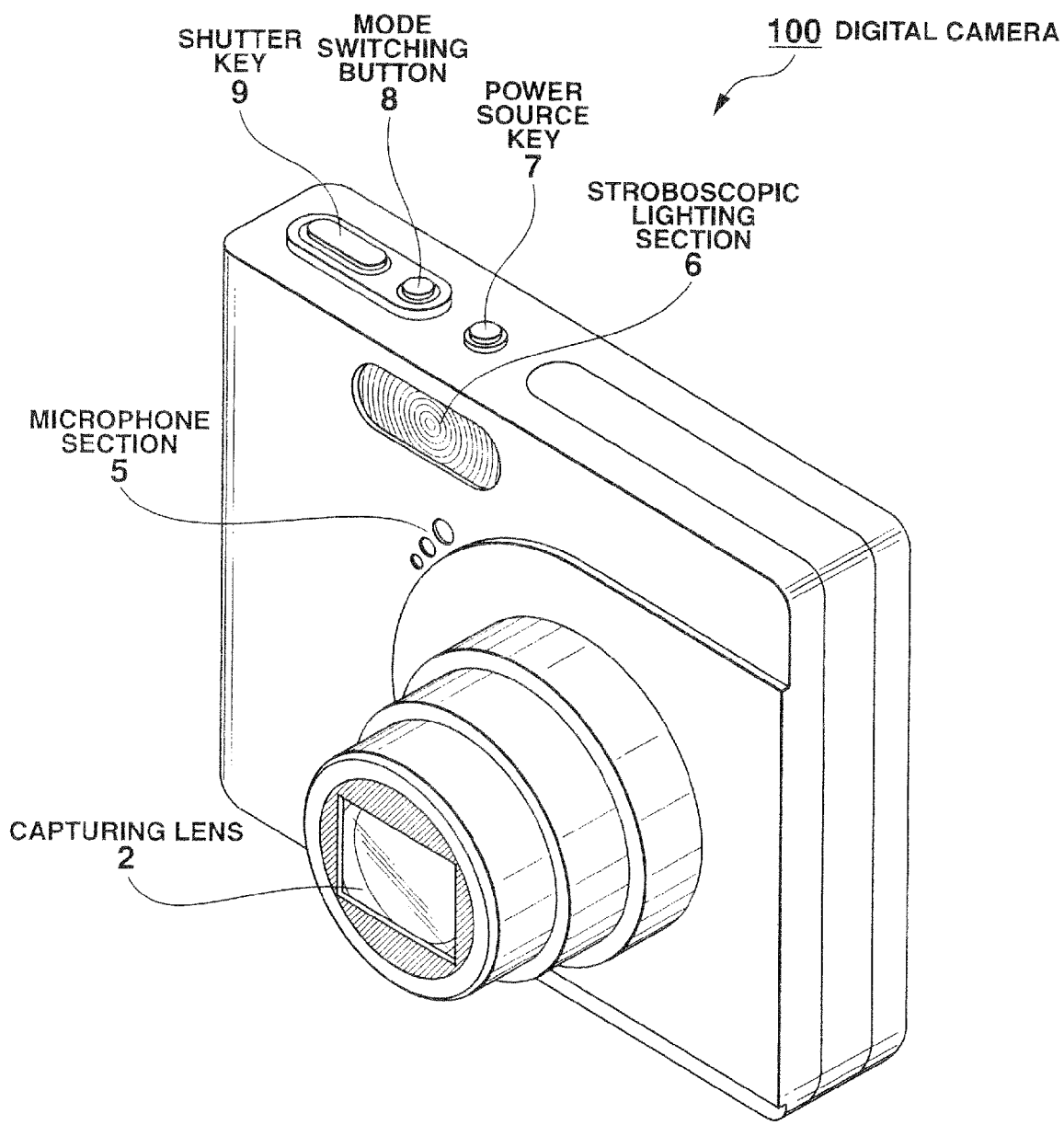
FIG. 1 is a view showing an example of the outline structure of a digital camera.

FIG. 1 is a view showing an example of the outline structure of a digital camera, and here, FIG. 1 mainly shows a front surface and an upper surface of the digital camera.

In a digital camera 100, a capturing lens 2, a microphone section 5, and a flash section 6 are arranged at the front surface of a rectangular thin metal appearance body, and at the right side on the upper surface (for the user), a power source key 7, a mode switching button 8, and a shutter key 9 are arranged, respectively.

The capturing lens 2 has a zoom function and an AF function of varying a focal length on no level and the capturing lens 2 sinks inside of the body when the power source is turned off and the capturing mode is a basic mode. The microphone section 5 may input a voice during capturing to convert it into an electric signal (namely, an analog voice signal).

The power source key 7 is a key to be operated for each on and off of the power source, the mode switching button 8 is a button to switch between a moving image capturing mode and a still image capturing mode by touching it once. If the user pushes down the mode switching button 8 during capturing of the moving image, the capturing mode is made into the still image capturing mode, and if the user pushes the mode switching button 8 during capturing of the still image, the capturing mode is made into the moving image capturing mode. The shutter key 9 is a capturing instructing unit for instructing the capturing timing in the capturing mode.

In addition, although no illustration is given here, on the rear surface of the digital camera 100, a mode switch for selecting respective processing modes, a menu key, an arrow key, a speaker, a stroboscopic charge lump and an image display unit are provided. It is defined that a memory card slot for attaching and detaching a memory card used as a recording medium and, for example, a USB (Universal Serial Bus) or the like as a serial interface connector to connect the digital camera 100 to a personal computer or the like at the outside thereof are provided on the bottom surface.

Figure 2:
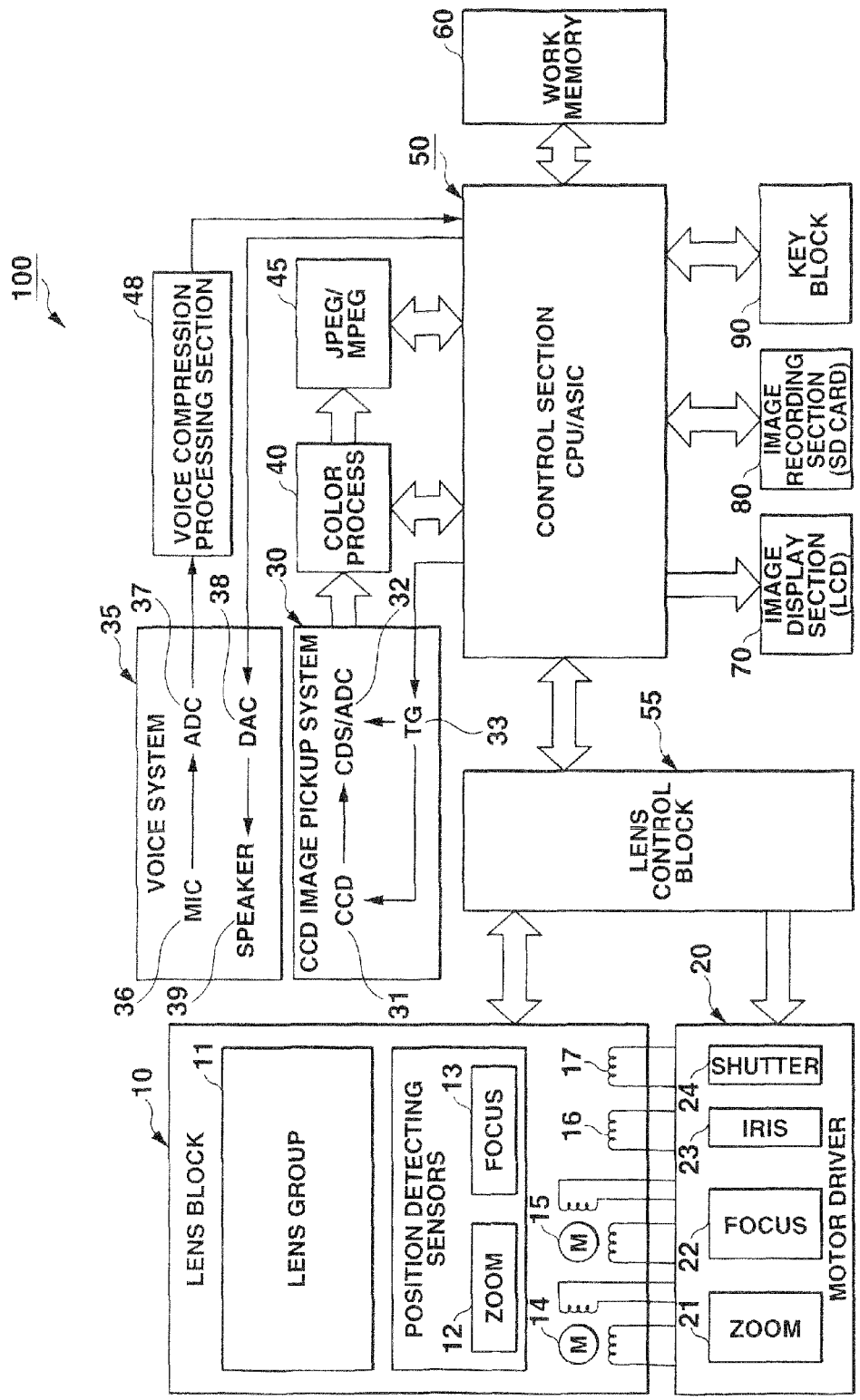
FIG. 2 is a block diagram showing an example of the circuit structure of the digital camera.

FIG. 2 is a block diagram showing an example of the circuit structure of the digital camera. This digital camera 100 is provided with a zoom function and an auto focus (AS) function, and has a lens block 10 for executing these functions.

The lens block 10 is provided with a sink-type of a lens group 11 made of a zoom lens and a focus lens that are arranged movably in an optical axial direction; position detecting sensors 12 and 13 for detecting a zoom position and a focus position in this lens group 11; a zoom motor 14 moving on the zoom lens; a focus motor 15 moving on the focus lens; an actuator for an aperture 16 to open and close the aperture (not illustrated); and an actuator for a shutter 17 to open and close a mechanical shutter. In addition, the above-described motor and actuators 14 to 17 are driven by respective drivers 21 to 24 for Zoom, Focus, Iris, and Shutter are provided on a motor driver block 20. Further, according to each embodiment of the present invention, the zoom motor 14, the driver for zoom 21, the focus motor 15, and the driver for focus 22 correspond to a lens driving unit of the present invention, respectively.

Respective drivers 21 to 24 of the above-described detecting sensors 12, 13 and the motor driver block 20 are operated by a control signal from a lens control block 55 to transmit the output of a sensor and the information such as the number of motor rotation or the like to a control section (CPU/ASIC (Application Specific Integrated Circuit)) 50 via the lens control block 55.

In addition, the digital camera 100 has a CCD imaging system block 30 made of a CCD 31 as an imaging device mainly arranged at a rear side of a capturing optical axis of the lens group 11; a CDS (Correlated Double Sampling)/AD block 32, and a TC (Timing Generator) 33. The CCD 31 converts photo electricity of the optical image of the object that is focused by the lens group 11 and the CCD 31 is scanned and driven by the TG 33 to output one screen of the photoelectric output for each period when the digital camera is set at a recording mode. The CDS/AD block 32 may remove noise from the analog output signal of which gain is appropriately adjusted for each color component of RGB by a correlation double sampling, may convert it into a digital signal after it is outputted from the CCD 31, and may output it to a color process circuit 40. In the meantime, the CCD is one kind of an imaging device and it may be other device such as CMOS.

Figure 3:
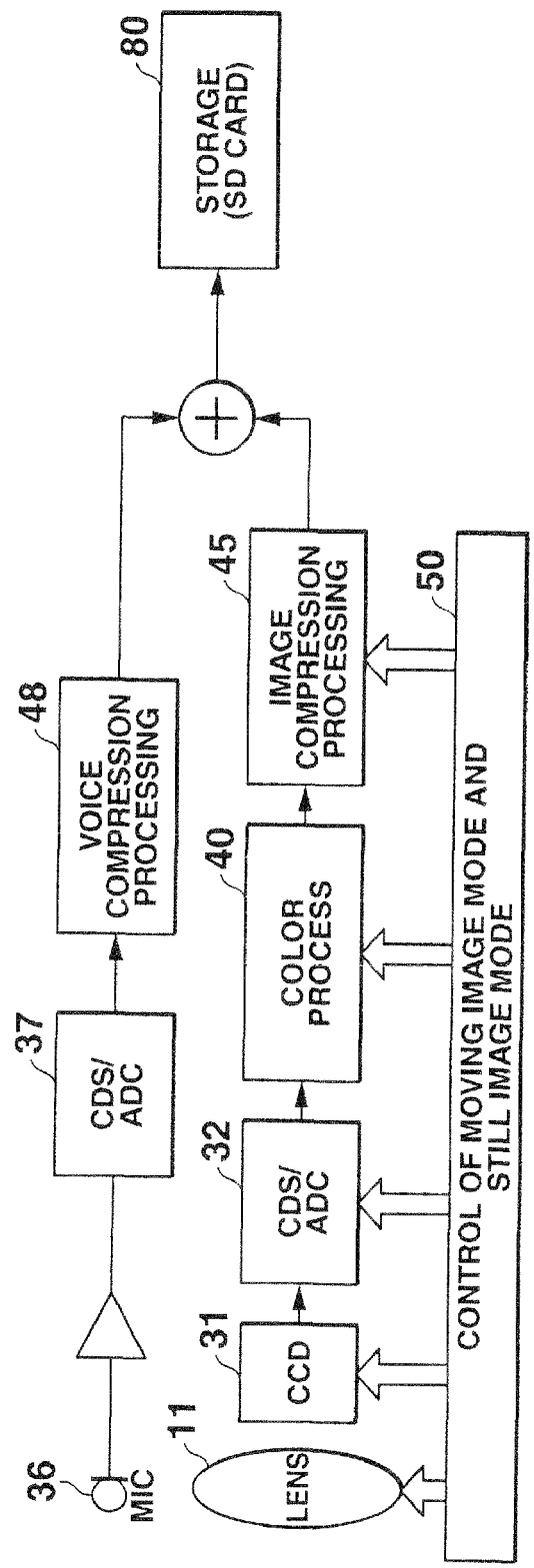
FIG. 3 is an explanatory view of transit of voice data and image data by recording and the parallel operation of the recording.

As shown in FIG. 3, a voice system block 35 is provided with a voice input system made of a microphone (MIC) 36 to input the voice and convert it into an analog voice signal and an A/D converter (ADC) 37 to convert the analog voice signal into a digital voice signal and transmit it to the control section 50 or the like and a voice output system made of a D/A converter (DAC) 38 to convert the digital voice signal to the analog voice signal and a speaker 39 to convert the analog voice signal received from the control section 50, reproduce and amplify the voice, and output it to the outside or the like.

Figure 4:
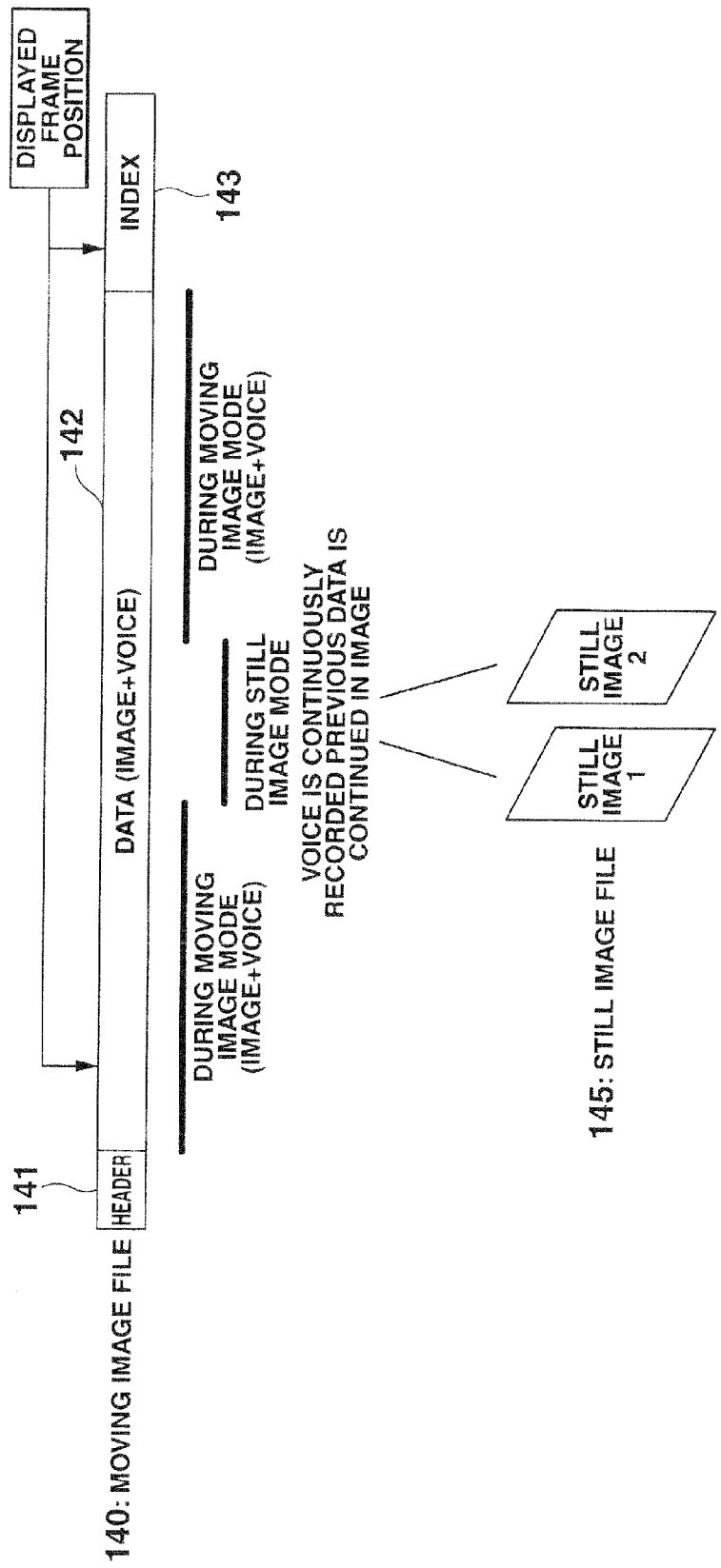
FIG. 4 is a pattern diagram of a moving image file and a still image file to be recorded in an image recording section.

In addition, as shown in FIGS. 3 and 4, recording of the voice and the capturing operation are carried out in parallel, and even if the moving image capturing mode is temporarily stopped to be switched into the still image capturing mode, the recording operation is continued and after the moving image capturing is restarted, the recording operation is continued. The input voice is transmitted to the control section 50 via the microphone 36 and the A/D converter 37 and the voice signal is scanned in a work memory 60. Then, upon recording, after the voice compression processing is applied, the voice signal is recorded and stored in a recording medium (for example, an SD card) that is detachably fit to an image recording section 80 as a moving image file (the moving image data+the voice data) together with the compressed moving image file.

The color process circuit 40 may apply the color process to carry out the pixel interpolation processing to the inputted imaging signal, may produce a luminance signal (Y) and a color difference signal (Cb, Cr) of a digital value, and may output them to the control section 50, which is a control unit of the present invention and entirely controls the digital camera 100.

In the still image capturing mode, a JPEG/MPEG section 45 may compress the data of the still image data scanned in the work memory 60 upon recording by the processing such as ADCT (Adaptive Discrete Cosine Transform) and a Huffman coding as an entropy coding system. Then, the JPEG/MPEG section 45 may read the acquired coding data from a JPEG/MPEG circuit 27 as the data file of one image and may record and store it in the SD card of the image recording section 80.

In addition, in the moving image capturing mode, upon recording, the JPEG/MPEG section 45 may compress the data of a sequence of the moving image data scanned in the work memory 60 by an MPEG (Moving Picture Experts Group) system or the like. Then, the JPEG/MPEG section 45 may read the acquired coding data from the JPEG/MPEG circuit 27 as the data file of one image and may record and store it in the SD card of the image recording section 80.

The above-described JPEG/MPEG section 45 corresponds to a plurality of compression rates and a mode to be stored corresponding to the compression rate may include a mode corresponding to a high resolution (generally, referred to as a high accuracy, fine, and normal resolution or the like) with a low compression rate and a mode corresponding to a low resolution (generally, referred to as an economy resolution or the like) with a high compression rate.

In addition, the mode corresponds to a high number of pixels and a low number of pixels. For example, there is a pixel size referred to as SXGA (1,600×1,200), XGA (1,024×786), SVGA (800×600), and VGA (640×480) or the like.

The control section 50 is actually a microprocessor that is provided with an inner memory such as a RAM and a flush memory, various kinds of arithmetic processing circuits, and an input and output interface of the data or the like, and the digital signal (the image signal) to be transmitted to the control section 50 is temporarily stored in the work memory 60 such as a DRAM to be transmitted to an image display section 70. Then, in accordance with termination of the compression processing of the luminance by one frame and the color difference signal and the all compression data to the recording medium (for example, the SD card) of the image recording section 80, the control section 50 may activate the path from the CCD 31 to the work memory 60 again.

In addition, the control section 50 makes the lens control block 55 to produce a driving signal to the transmitted to respective drivers 21 to 24 of the above-described motor driver block 20 on the basis of various lens operation control programs stored in a rewritable memory such as a flush memory and the operation signals or the like from a key block 90, and thereby, the control section 50 may control the position of the zoom lens and the focus lens, the opening of the aperture, and the mechanical opening and closing operation. In this case, in the control section 50, the information of the lens positions of the zoom lens and the focus lens that are detected by the position detecting sensors 12 and 13 for the zoom position and the focus position are sequentially inputted via the lens control block 55.

The image display section 70 may include a video encoder, a VRAM controller, a VRAM, a liquid crystal monitor, and its driving circuit, may produce a video signal based on the transmitted digital signal by the video encoder, and may display the display image based on the video signal, namely, the through image and menu data or the like of the object imaged by the CCD 31 on a liquid crystal monitor.

In addition, the image display section 70 functions as a monitor display section (an electronic finder) and displays the image based on the image information scanned from the VRAM controller at that point in real time by displaying the image based on the video signal from the video encoder.

Thus, if the above-described shutter key 9 is operated under so-called a display condition of the through image, in which the image at that point is displayed on the image display section 70 in real time as the monitor image, a trigger signal is produced.

The control section 50 may stop the path from the CCD 31 to the work memory 60 just after the DMA transmission of the luminance and the color difference signal for one screen scanned from the CCD 31 at that point in accordance with this trigger signal to the work memory 60 has been terminated to transit to the condition of recording and storing.

An image recording section 80 is specifically composed of a card interface and various non-volatile memory cards (for example, an SD card) to be connected to the control section 50 via this card interface and to be detachably fit to a camera body. The image data recorded in the image recording section 80 is read by the control section 50 in a reproduction mode and after being expanded by the JPEG/MPEG section 45, the image data is transmitted to the image display section 70 to be displayed on the liquid crystal monitor.

The key block 90 is composed of various keys such as the above-described power source key 7, the mode switching button 8, the shutter key 9, the menu key, and the zoom key or the like and a sub CPU/ASIC (not illustrated) to accept these inputs and transmit an operational signal in accordance with them to the control section 50. In the meantime, the sub CPU/ASIC may transmit a condition signal (hereinafter, the key information) indicating the condition of a mode switching button if necessary.

FIG. 3 is an explanatory view of transit of the voice data and the image data by recording and the parallel operation of the recording. The voice data converted into a digital voice signal in the voice system block 35 is compression-processed in a voice compression processing section 48 to be recorded continuously from the start of capturing of the moving image till the end (namely, recorded in the SD card of the image recording section 80).

On the other hand, the digital image data produced by obtaining the CCD imaging system block 30 and the color process circuit 40 is compression-processed by the JPEG/MPEG section 45 and is continuously recorded in the moving image capturing mode, however, if the capturing mode is switched to the still image capturing mode with the mode switching button 8 pressed, scanning only the still image after completely pressing the shutter key 9, this is recorded as the still image file separately from the moving image. In addition, in the still image capturing mode, the image data scanned just before pressing the mode switching button 8 is repeatedly used to be recorded as the moving image data (thus, a small memory capacity is available because the data is the same as the previous one). Next, when the mode switching button 8 is pressed again, capturing of the moving image is started and recording of the new moving signal is started. In addition, the voice data of the new moving signal is recorded corresponding to the moving image to be recorded in chronicle order.

FIG. 4 is a pattern diagram of a moving image file and a still image file to be recorded in the image recording section 80. A moving file 140 is made of a header portion 141 including the information such as a file size, the number of frames, and the voice data size, a data portion 142 including the real data such as a voice and an image, and an index portion 143 for making the random access easier. In the still image capturing mode, the data portion 142 may scan only the voice. With respect to the moving image, the moving data scanned just before pressing the mode switching button 8 is repeatedly recorded. In addition, the still image data that has been filmed during this period is recorded as a still image file 145.

First Embodiment

According to the present embodiment, when capturing of the moving image is temporarily stopped for capturing the still image, an example such that the field angle information at that time (for example, the zoom position) is stored and the field angle is returned to the original one by using the field angle information that has been stored after termination of capturing of the still image will be described below.

Figure 5:
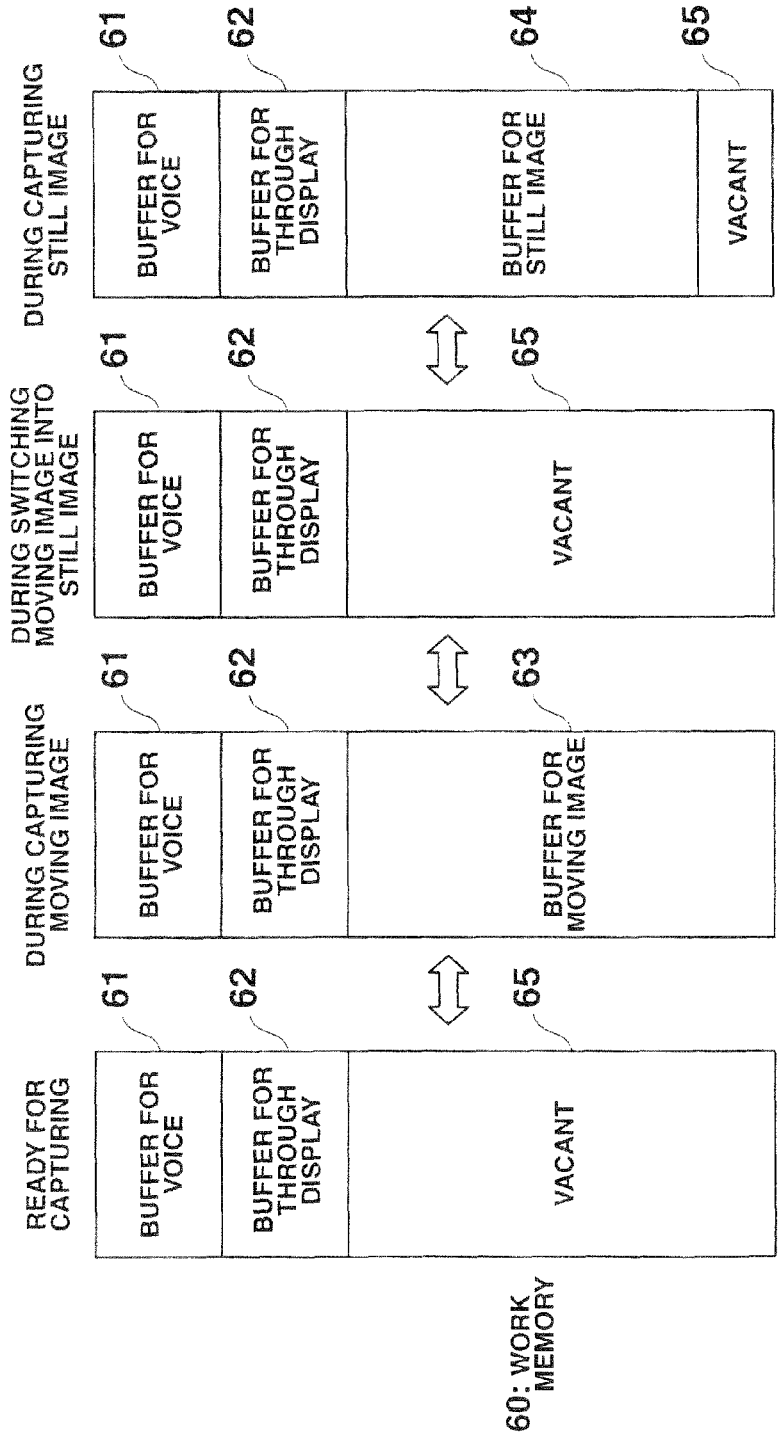
FIGS. 5A through 5D illustrate explanatory views showing a condition using a range of a work memory according to a first embodiment.

FIG. 5 is an explanatory view showing a condition using a range of a work memory according to the first embodiment, FIG. 5A shows the condition of the work area 60 ready for capturing, FIG. 5B shows the condition of the work area 60 during capturing the moving image, FIG. 5C shows the condition of the work area 60 during switching the moving image into the still image, and FIG. 5D shows the condition of the work area 60 during capturing the still image.

Ready for capturing means a through display condition just after activating the digital camera 100, and while ready for capturing, as shown in FIG. 5A, a buffer for voice 61 and a buffer for a through display 62 are secured in the work area 60, the voice data to be scanned while ready for capturing is stored in the buffer for voice 61, and the image data to be scanned while ready for capturing is stored in the buffer for through display 62.

During capturing of the moving image, as shown in FIG. 5B, further, a buffer for a moving image 63 is secured in the work area 60, the voice data to be scanned during capturing the moving image is stored in the buffer for voice 61, the image data to be scanned during capturing the moving image is stored in the buffer for through display 62, and the moving image data to be scanned by capturing of the moving image is stored in the buffer for a moving image 63.

In addition, as shown in FIG. 5C, during switching the moving image into the still image, the buffer for voice 61 and the buffer for the through display 62 are used, the voice data to be scanned during switching the moving image into the still image is stored in the buffer for the voice 61, and the objective image data to be scanned during switching the moving image into the still image is stored in the buffer for the through display 62.

During capturing of the still image, as shown in FIG. 5D, a buffer for a still image 64 is secured in the work area 60 in addition to the buffer for voice 61 and the buffer for the through display 62, the voice data to be scanned during capturing of the still image is stored in the buffer for voice 61, the objective image data to be scanned during capturing of the still image is stored in the buffer for through display 62, and the still image data to be scanned by capturing of the still image is stored in the buffer for the still image 63. In addition, a reference numeral 65 denotes a free area.

In the meantime, since the through display is continued in any operation of a sequence, the buffer for through display 62 has been always used.

Figure 6:
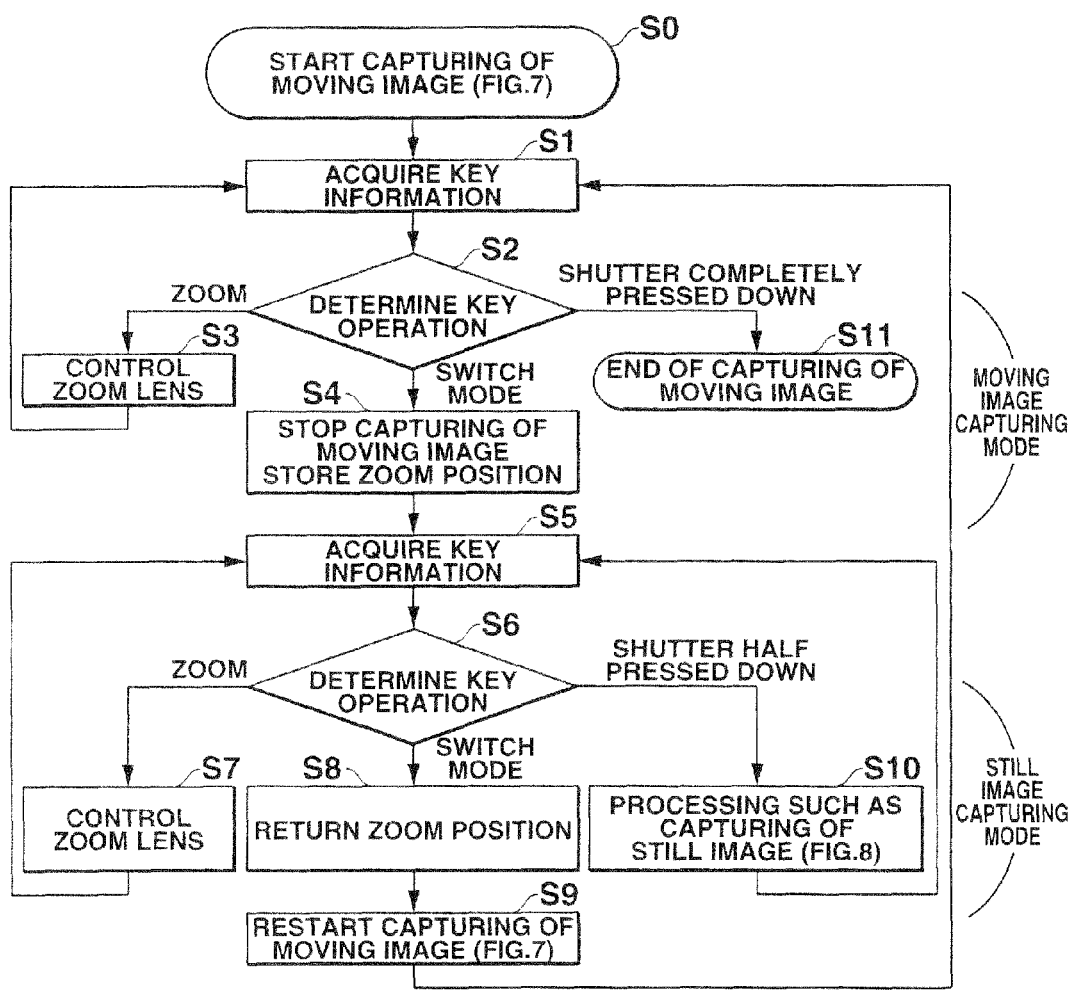
FIG. 6 is a flowchart showing the switching operation between a moving image capturing mode and a still image capturing mode according to the first embodiment.

FIG. 6 is a flow chart showing the switching operation between the moving image capturing mode and the still image capturing mode according to the first embodiment. The following processing is basically carried out in accordance with a program fixed and stored in a program storage memory such as a flush memory by the control section 50.

In addition, according to the present embodiment, the shutter key 9 may be activated by stroke operation of two steps. As the basic operation, in the moving capturing mode, capturing of the moving image is started by the stroke operation of the first step, namely, with the shutter key "half-pressed", and after that, capturing of the moving image is terminated by the stroke operation of the second step, namely, with the shutter 9 "completely pressed".

In addition, in the still image capturing mode, the AF operation is carried out to lock the focused focal condition and the exposure condition with the shutter key 9 "half-pressed", and after that, the capturing due to the locked focused focal condition and the locked exposure condition is carried out by the stroke operation of the second step, namely, with the shutter 9 "completely pressed".

In FIG. 6, if the moving image capturing mode is selected, recording is started via the voice system block 35, and the image data is scanned via the CCD imaging system block 30 and the color process circuit 40 to be displayed on the image display section 70 as the through image, capturing of the moving image is started by the semi-pressuring operation of the shutter key 9, and the moving image data and the recording data are recorded in the image recording section 80 (step S0).

Acquiring the key information (namely, the conditional signal from the key block 90) during capturing of the moving image in the above step 0 (step S1), the control section 50 may check this key information. Then, when the key information indicates the operation condition of the zoom key, the control section 50 may proceed to step S3, when it indicates the pressing down of the mode switching button 8, the control section 50 may proceed to step S4, and when it indicates complete-pressing down of the shutter key 9, the control section 50 may proceed to step S12 (step S2).

If the zoom key is operated, the control section 50 may carry out the zoom lens control. In other words, producing a zoom lens control signal from the position information of the zoom lens from the zoom position detecting sensor 12 and the zoom lens moving information in accordance with the operation of the zoom key, the control section 50 may transmit the zoom lens control signal to the zoom motor driver 21 via the lens control block 55, it may drive the zoom motor 14 to move the zoom lens to the wide side or the telescopic side to return to the step S1 (step S3).

If the mode switching button 8 is pressed, the control section 50 may stop capturing of the moving image (namely, recording of the moving data in the image recording section 80), may retain (temporarily store) the zoom position information (namely, the field angle information) acquired from the zoom position detecting sensor 12 just before stopping capturing of the moving Image in the RAM, and may proceed to step S5 (step S4).

Further, the control section 50 may wait for acquisition of the key information. Then, acquiring the key information (step S5), the control section 50 may check the key information, and if the key information indicates the operational condition of the zoom key, it may proceed to step S7, if it means pressing down of the mode switching button 8, it may proceed to step S8, and if it means half-pressing down of the shutter key 9, it may proceed to step S10 (step S4).

If the zoom key is operated, the control 50 may carry out the same zoom lens control as the above step S3, and driving the zoom motor 14, it may move the zoom lens to the wide side or the telescopic side and may return to the step S5 (step S7).

In the case where the mode switching button 8 is pressed down, taking out the zoom position information retained in the RAM in the above step S4, producing a zoom lens control signal on the basis of this zoom position information, transmitting it to the zoom motor driver 21 via the lens control block 55, driving the zoom motor 14 to move the zoom lens to the wide side or the telescopic side, returning the position of the zoom lens to the position just before stopping of the moving image capturing in the above step S4 (step S8), and restarting capturing of the moving image (refer to steps T1 to T4 in FIG. 7), if capturing of the moving image is terminated, the processing may return to the step S1 (step S9).

If the shutter 9 is half-pressed, the still image capturing processing or the like (refer to steps U1 to U7 in FIG. 8) is started and when capturing of the still image is terminated, the processing may return to the step S5 (step S10).

When the shutter key 9 is completely pressed down during capturing of the moving image in the above step S0 or S9, terminating capturing of the moving image, as shown in the example of FIG. 4, the moving image data and the recording data recorded in the moving image capturing mode are newly recorded in the image recording section 80 (step S11).

According to the operation shown by the flow chart of FIG. 6, when capturing of the moving image is temporarily stopped due to capturing of the still image, by storing the field angle information (the zoom position information) just before capturing of the moving image is temporarily stopped due to capturing of the still image and using the field angle information stored after the still image is filmed, the field angle can be returned to the original field angle, so that the field angle coincides with the original one when the recorded moving image file is reproduced and the user does not feel uncomfortable between the moving image before capturing of the still image and the moving image just after capturing of the still image although the moving image during capturing of the still image is stopped.

Figure 7:
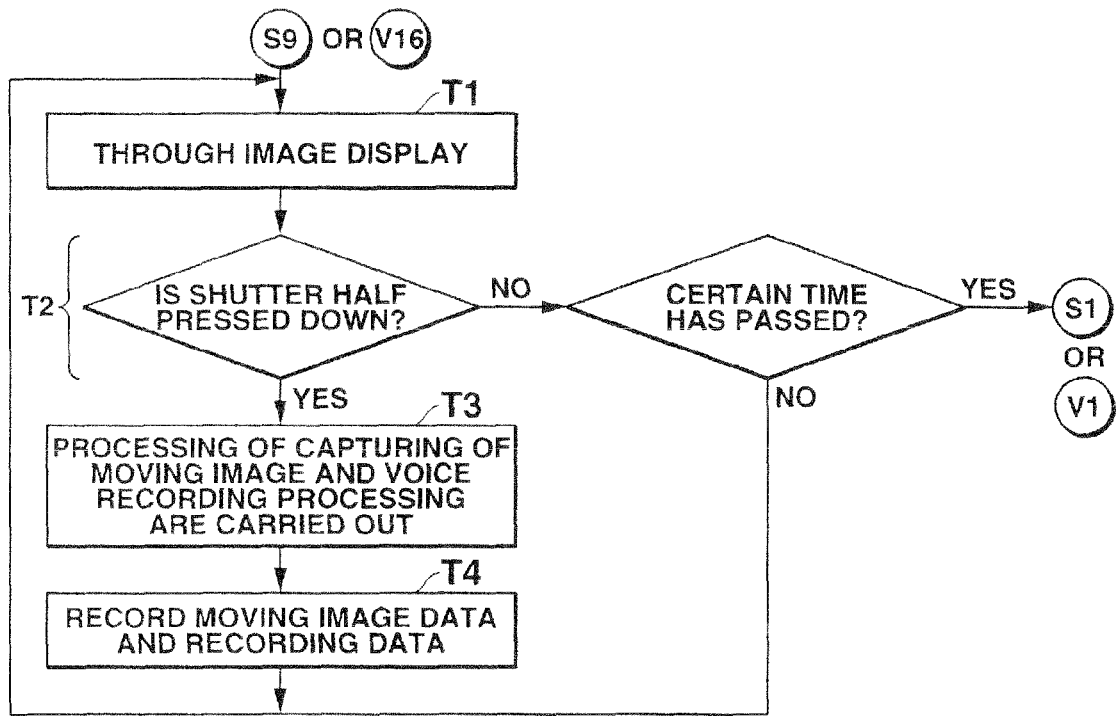
FIG. 7 is a flowchart showing the moving image capturing processing operation in FIGS. 6 and 10.
Figure 10:
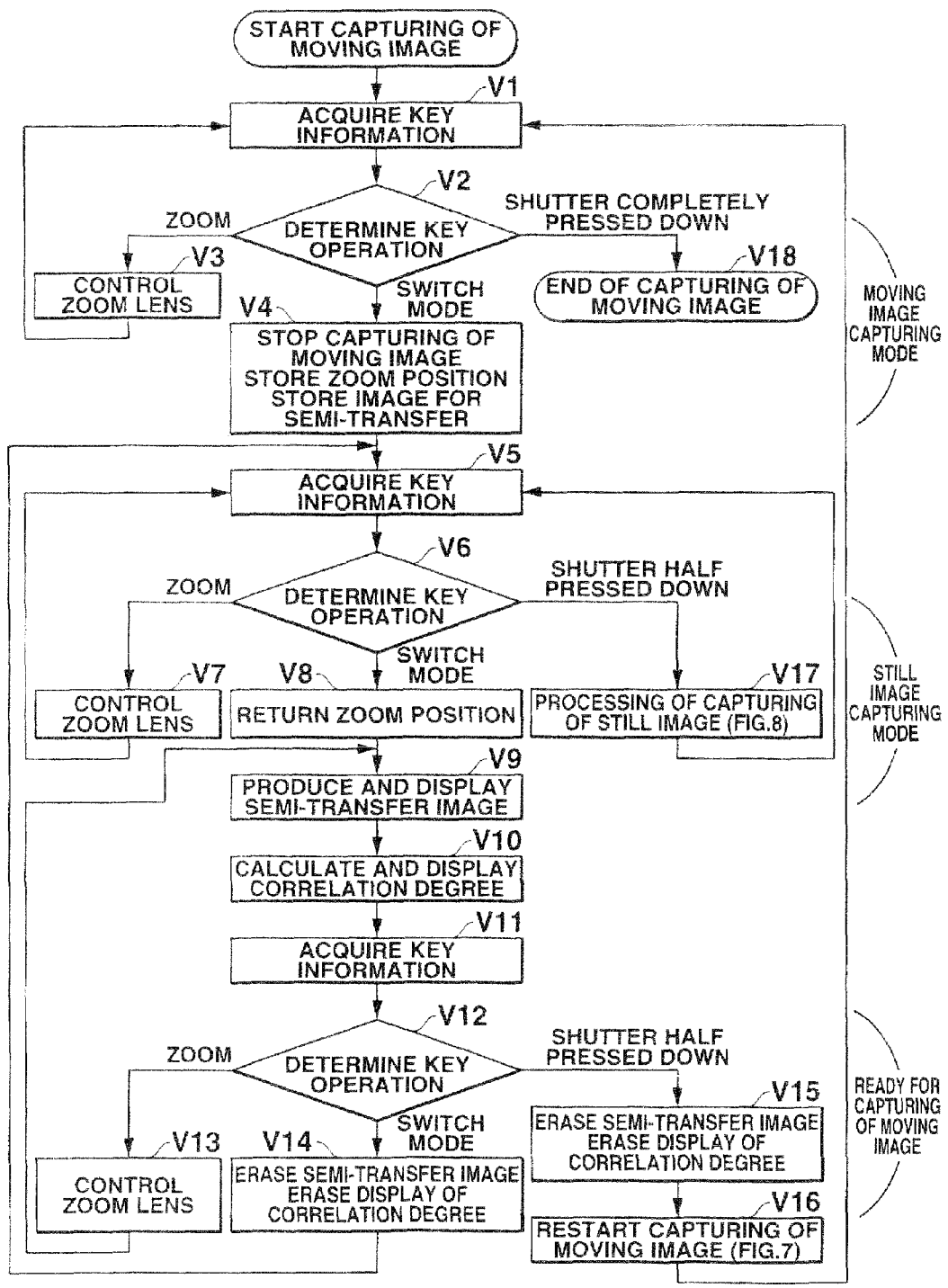
FIG. 10 is a flowchart showing the switching operation between a moving image capturing mode and a still image capturing mode according to the second embodiment.

FIG. 7 is a flow chart showing the moving image capturing processing operation in the step S9 in FIG. 6 (or a step V16 in FIG. 10).

Through the steps S6 and S8 in FIG. 6 (or steps V12 and V15 in FIG. 10), as shown in FIG. 3, the control section 50 may thin out the moving image data produced by acquiring the CCD imaging system block 30 and the color process circuit 40 to through-display it on the monitor screen of the image display section 70 (step T1).

Subsequently, the control section 50 may check the key information from the key block 90. If the key information meaning half-pressing of the shutter key 9 is received, the control section 50 may proceed to the step T3 and if there is the key operation other than half-processing down of the shutter key 9 or the key is not operated after a certain time has passed, the control section 50 may return to the step S1 (step T2).

If the shutter key 9 is half-pressed down, the control section 50 may record the voice via the voice system block 35 and further may film the moving image while scanning the image data via the CCD imaging system block 30 and the color process circuit 40 (step T3). Then, compressing the voice data by the voice compression processing section 48, compressing and processing the moving data by the JPEG/MPEG section 45, and recording the compressed voice data and moving data in the SD card of the image recording section 80 as related to each other, the control section 50 may return to the step T1 (step T4).

Figure 8:
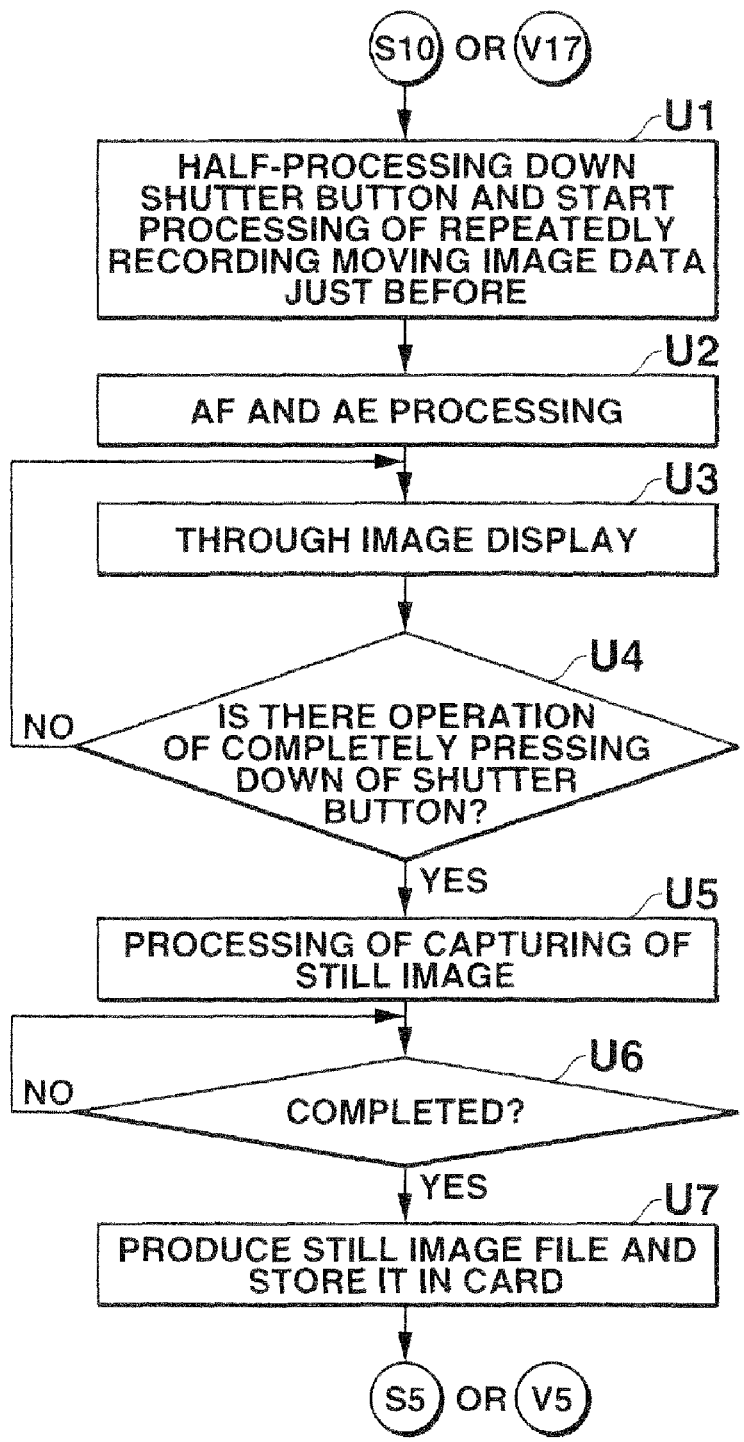
FIG. 8 is a flowchart showing the still image capturing processing operation in FIGS. 6 and 10.

FIG. 8 is a flow chart showing the still image capturing processing operation in step S10 shown in FIG. 6 (or step V17 in FIG. 10).

In the case where the key information means half-pressing down of the shutter key 9 in the step S6 in FIG. 6 (or V6 in FIG. 10), the moving data generated just before half-pressing down of the shutter key 9 is retained in the work memory 6 to start the processing for repeatedly recording the moving data in the SD card of the image recording section 80 at a certain time interval. This repetition processing is carried out in parallel with the still image capturing till the mode switching button 8 is determined to be pressed down in the step S6 of FIG. 6 (step U1).

The control section 50 may carry out the auto focus (AF) processing and the auto iris (AE) processing at a focal length corresponding to the zoom position selected at that point (step U2) and may check if the shutter key 9 is completely pressed down or not while thinning out the image data generated by acquiring the CCD imaging system block 30 and the color process circuit 40 and through-displaying the image data on the monitor screen of the image display section 70 (step U3) Then, if the shutter key 9 is completely pressed down, the control section 50 may proceed to step U5 and if it is not so, returning to the step S3, the control section 50 may repeat the operation to display the through image (step U4).

When the shutter key 9 is completely pressed down, scanning the still image capturing processing, namely, the image data generated just before completely pressing down of the shutter key 9 by acquiring the CCD imaging system block 30 and the color process circuit 40 in the work memory 60 and transmitting it to the image display section 70 to display the still image (step U5), the control section 50 may proceed to step U7 when the still image capturing processing is completed (step U6).

Subsequently, compression-processing the image data (the still image data) for one frame stored in the work memory 60 by the JPEG/MPEG section 45 and recording the compressed still image data in the SD card of the image recording section 80, the control section 50 may return to the step S5 (or the step V5 in FIG. 10) (step U7).

Thereby, even if the user changes the field angle and the capturing angle upon capturing of the still image, they are returned to the original field angle and the original capturing angle when the capturing is returned to the moving image capturing, so that the user can acquire the moving image without uncomfortable. In other words, since the field angle is completely retained and the angle is completely returned, upon restart of capturing of the moving image, it is possible to coincide the field angle and the framing of the moving image changed upon capturing of the still image with the original angle and the original framing.

Modified Embodiment

According to the present first embodiment, by retaining the field angle information just before switching when the moving image capturing mode is switched to the still image capturing mode and returning the field angle to that upon capturing of the moving image before start of the previous capturing of the still image by the zoom lens control when the still image capturing mode is returned to the moving image capturing mode, even if the user chances the field angle upon capturing of the still image, the field angle is returned to the original field angle upon returning to the moving image capturing, however, the parameters other than the field angle may be combined.

For example, in combination to an apparatus automatically capable of panning (for example, a camera platform of which posture can be controlled (not illustrated), the capturing direction upon capturing of the moving image (the upper, lower, right, and left angles in this case) is acquired, not only the field angle but also the direction just before switching is retained when the moving image capturing mode is switched to the still image capturing mode, the field angle is returned to that upon capturing of the moving image before start of the previous still image capturing by the zoom lens control when returning the still image capturing mode into the moving image capturing mode, and the original moving image capturing angle is reproduced by controlling the apparatus capable of panning using the retained direction. Then, the moving capturing may be restarted and be continued.

Thereby, even if the user changes the field angle and the capturing angle upon capturing of the still image, the field angle and the capturing angle are returned to the original one upon returning to capturing of the moving image, so that the moving image without uncomfortable can be acquired. In other words, since the angle can be completely retained and returned, it is possible to approximately coincide the field angle and the framing of the moving image changed upon restart of capturing of the moving image with the original one.

In addition, not only the capturing angle but also various parameters (for example, a color processing parameter, an outline processing parameter, compression parameter such as a pixel size (resolution) and an image size or the like) may be set again upon capturing of the moving image and capturing of the still image.

Second Embodiment

According to the first embodiment, by returning the zoom position, capturing of the moving image is continued with the field angle fixed, and further, according to its modified embodiment, by adding the panning apparatus, the moving image capturing angle can be completely restarted and continued, however, according to the present embodiment, an example such that capturing of the moving image is restarted and continued by coinciding the framing to the original one by the accurate capturing angle without using the panning apparatus will be described below.

According to the present embodiment, when capturing of the moving image is temporarily stopped due to capturing of the still image, storing the filmed image (the moving image) just before it and automatically returning it to the original field angle after capturing of the still image is terminated, then, the stored image is superimposed and displayed on a through image to be displayed in a semi-transfer condition upon capturing of the moving image so as to assist the framing.

Figure 9:
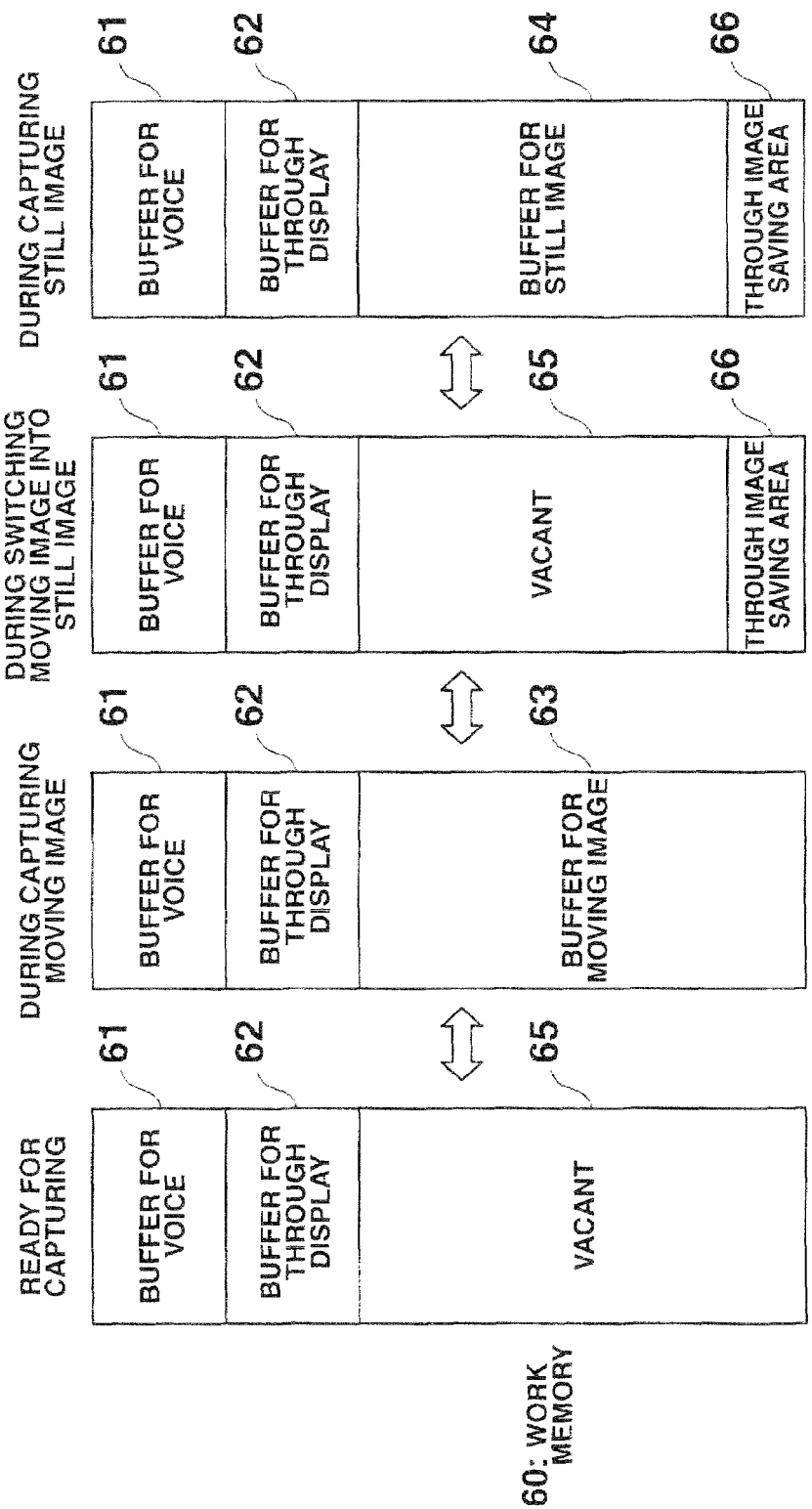
FIGS. 9A through 9D illustrate explanatory views showing a condition using a range of a work memory according to a second embodiment.

FIG. 9 is an explanatory view showing a condition using a range of a work memory in the capturing mode according to the present embodiment, FIG. 9A shows the condition of the work area 60 ready for capturing, FIG. 9B shows the condition of the work area 60 during capturing of the moving image, FIG. 9C shows the condition of the work area 60 during switching the moving image to the still image, and FIG. 9D shows the condition of the work area 60 during capturing of the still image.

During being ready for capturing, as shown in FIG. 9A, the buffer for voice 61 and the buffer for the through display 62 are secured in the work area 60, the voice data to be scanned during being ready for capturing is stored in the buffer for voice 61, and the objective image data to be scanned during being ready for capturing is stored in the buffer for the through display 62.

As shown in FIG. 9B, further, the buffer for the still image 63 is secured in the work area 60, the voice data to be scanned during capturing of the moving image is stored in the buffer for voice 61, the objective image data to be scanned during capturing of the moving image is stored in the buffer for the through display 62, and the moving image data to be scanned by capturing of the moving mage is stored in the buffer for the still image 63.

In addition, during switching the moving image into the still image, as shown in FIG. 9C, a through image saving area 66 is secured in the working area 60 in addition to the buffer for voice 61 and the buffer for the through display 62, the voice data to be scanned during switching the moving image into the still image is stored in the buffer for voice 61, the objective image data to be scanned during switching the moving image into the still image is stored in the buffer for through display 62, and the last through image frame (the through image frame just before the operation of the mode switching button 8 (the image for the semi-transfer condition)) is stored in the through image saving area 66.

During capturing of the still image, as shown in FIG. 9D, a buffer for a still image 63 and the through image saving area 66 are secured in the working area 60 in addition to the buffer for voice 61 and the buffer for the through display 62, the voice data to be scanned during capturing of the still image is stored in the buffer for voice 61, the image data to be scanned during capturing of the still image is stored in the buffer for through display 62, the still image data to be scanned during capturing of the still image is stored in a buffer for a still image 64 and the last through image frame is stored in the through image saving area 66.

In the meantime, since the through display is continued in any operation of a sequence, the buffer for through display 62 has been always used.

FIG. 10 is a flow chart showing the switching operation between a moving image capturing mode and a still image capturing mode according to the second embodiment. Basically, the control section 50 may carry out the following processing in accordance with a program fixed and stored in the program storage memory such as the flush memory.

In addition, according to the present embodiment, the shutter key 9 may be activated by stroke operation of two steps. As the basic operation, in the moving capturing mode, capturing of the moving image is started by the stroke operation of the first step, namely, with the shutter key "half-pressed", and after that, capturing of the moving image is terminated by the stroke operation of the second step, namely, with the shutter 9 "completely pressed".

In addition, in the still image capturing mode, the AF operation is carried out to lock the focused focal condition and the exposure condition with the shutter key 9 "half-pressed", and after that, the capturing due to the locked focused focal condition and the locked exposure condition is carried out by the stroke operation of the second step, namely, with the shutter 9 "completely pressed".

In FIG. 10, if the moving image capturing mode is selected, recording is started via the voice system block 35, and the image data is scanned via the CCD imaging system block 30 and the color process circuit 40 to be displayed on the image display section 70 as the through image, capturing of the moving image is started by the semi-pressing operation of the shutter key 9, and the moving image data and the recording data are recorded in the image recording section 80 (step V0).

Acquiring the key information (namely, the conditional signal from the key block 90) during capturing of the moving image in the above step 0 (step V1), the control section 50 may check this key information. Then, when the key information indicates the operation condition of the zoom key, the control section 50 may proceed to step V3, when it indicates the pressing down of the mode switching button 8, the control section 50 may proceed to step V4, and when it indicates complete-pressing down of the shutter key 9, the control section 50 may proceed to step V18 (step V2).

If the zoom key is operated, the control section 50 may carry out the zoom lens control. In other words, producing a zoom lens control signal from the position information of the zoom lens from the zoom position detecting sensor 12 and the zoom lens moving Information in accordance with the operation of the zoom key, the control section 50 may transmit the zoom lens control signal to the zoom motor driver 12 via the lens control block 55, it may drive the zoom motor 14 to move the zoom lens to the wide side or the telescopic side to return to the step V1 (step V3).

If the mode switching button 8 is pressed, the control section 50 may stop capturing of the moving image (namely, recording of the moving data and the recording data in the image recording section 80), may retain (temporarily store) the zoom position information acquired from the zoom position detecting sensor 12 just before stopping capturing of the moving image and the moving image data (the image for the semi-transfer condition) that is through-image displayed are in the RAM, and may proceed to step V5 (step V4).

Further, the control section 50 may wait for acquisition of the key information. Then, acquiring the key information (step V5), the control section 50 may check the key information, and if the key information indicates the operational condition of the zoom key, it may proceed to step V7, if it means pressing down of the mode switching button 8, it may proceed to step V8, and if it means half-pressing down of the shutter key 9, it may proceed to step V17 (step V6).

If the zoom key is operated, the control 50 may carry out the same zoom lens control as the above step V3, and driving the zoom motor 14, it may move the zoom lens to the wide side or the telescopic side and may return to the step V5 (step V7).

In the case where the mode switching button 8 is pressed down, taking out the zoom position information retained in the RAM in the above step V4, producing a zoom lens control signal on the basis of this zoom position information, transmitting it to the zoom motor driver 21 via the lens control block 55, driving the zoom motor 14 to move the zoom lens to the wide side or the telescopic side, returning the position of the zoom lens to the position just before stopping of the moving image capturing in the above step S4 (step V8), producing semi-transfer images 72 and 74 that the pixels are further thinned out from the image data retained in the RAM in the above step V4, and transmitting them to the image display section 70 (superimposing them on the moving image through images 71 and 73 to be displayed in the step T1 of FIG. 7) these semi-transfer images 72 and 74 are displayed (refer to FIG. 11) (step V9).

Figure 11:
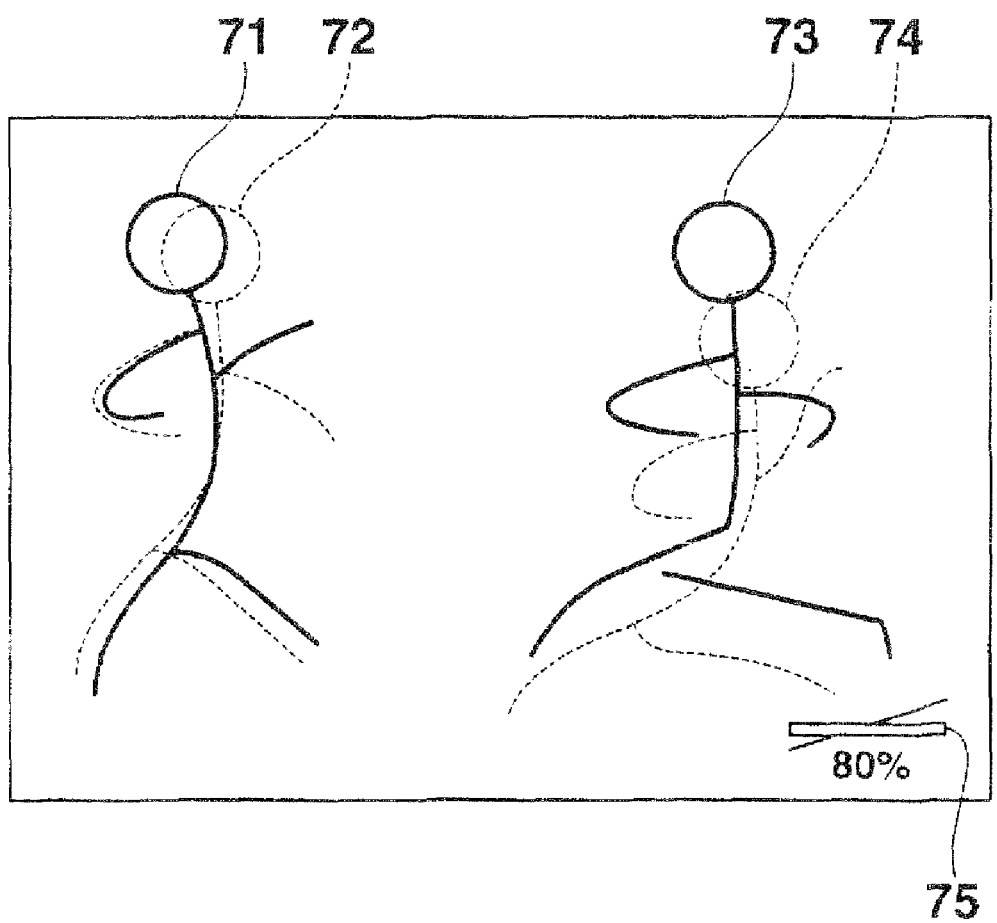
FIG. 11 is a view showing an example of a semi-transfer image and a correlation degree to be superimposed and displayed on a through image when capturing the moving image is restarted.

Further, calculating a difference among the right, left, upper, and lower angles from the image data retained in the above step V4 and the image data that is newly scanned from the CCD imaging system block 30, acquiring a degree of correlation of the capturing angle, producing the degree of correlation display data 75, and transmitting it to the image display section 70 (superimposing them on the moving image through images 71 and 73 to the displayed in the step T1 of FIG. 7 and the semi-transfer images 72 and 74 as shown in the example of FIG. 11), these semi-transfer images 72 and 74 are displayed (step V10).

Further, the control section 50 may wait for acquisition of the key information. Then, acquiring the key information (step V11), the control section 50 may check the key information, and if the key information indicates the operational condition of the zoom key, it may proceed to step V13, if it means pressing down of the mode switching button 8, it may proceed to step V13, and if it means half-pressing down of the shutter key 9, it may proceed to step V15 (step V12).

If the zoom key is operated, the control 50 may carry out the same zoom lens control as the above step V3, and driving the zoom motor 14, it may move the zoom lens to the wide side or the telescopic side and may return to the step V9 (step V13).

In the case where the mode switching button 8 is pressed down, stopping transmission of the semi-through image and the correlation degree data that are produced in the above steps V9 and V10 to the image display section 70, and erasing the display of the semi-through image and the correlation degree data on the monitor screen, the control section 50 may return to the step V9 (step V14).

If the shutter 9 is half-pressed, stopping transmission of the semi-through image and the correlation degree data that are produced in the above steps V9 and V10 to the image display section 70, and erasing the display of the semi-through image and the correlation degree data on the monitor screen (step V15), and restarting capturing of the moving image (refer to steps T1 to T4 in FIG. 7), the control section 50 may return to the step V1 when capturing of the moving image is terminated (step V16).

In addition, if the shutter 9 is half-pressed, starting the still image capturing processing or the like (refer to the step U1 to step U7 in FIG. 8), the control section 50 may return to the step V5 (step V17).

When the shutter key 9 is completely pressed down during capturing of the moving Image in the above step V0, terminating capturing of the moving image, as shown in the example of FIG. 4, the moving image data and the recording data recorded in the moving image capturing mode are newly recorded in the image recording section 80 (step V18).

According to the operation shown in the flow chart in FIG. 10, when capturing of the moving image is temporarily stopped due to capturing of the still image, storing the through image data together with the field information (the zoom position information) just before capturing of the moving image is temporarily stopped due to capturing of the still image, if capturing of the moving image is terminated, the stored field angle information is taken out to reproduce the field angle and the semi-transfer image is produced on the basis of the stored through image data, and this semi-transfer image is superimposed and displayed upon the through display after restart of the moving image capturing. As a result, moving the digital camera 100 so that the capturing angle is approximately equal to the frame just before stop of the moving image capturing to check the digital camera 100, it is possible to start the moving image capturing with the capturing angle that is approximately equal to the frame just before stopping of the moving image capturing. In the meantime, by superimposing and displaying the semi-transfer image on the through image, the capturing angle may easily coincide with the frame just before stop of the moving image capturing, so that more accurate angle setting is possible and the moving image can be smoothly continued.

In addition, obtaining the correlation degree data between the image data upon the previous capturing of the moving image and the image data newly scanned after restart of the moving image capturing, the correlation degree is superimposed and displayed upon the through display after restarting the moving image capturing, as shown in FIG. 11, the correlation between the angle of the previous capturing of the moving image and the present capturing image can be checked by a numeric value and a figure. Therefore, upon restart of capturing of the moving image, the capturing angle can be set more accurately.

In the meantime, the image stored for the semi-transfer image (and for calculating the correlation degree) in the above step V4 may be the image data scanned in the work memory 60 via the CCD imaging system block 30 and the color process circuit 40 other than the through image.

FIG. 11 is a view showing an example of a semi-transfer image and a correlation degree to be superimposed and displayed on a through image when capturing the moving image is restarted. In FIG. 11, the image outlined by a solid line indicated by reference numerals 71 and 73 represents the through image of the moving image to be scanned after restart of capturing of the moving image and the image outlined by a broken line indicated by reference numerals 72 and 74 represents the semi-transfer image of the through image of the moving image (for one frame) that was displayed just before stop of capturing of the moving image due to the previous mode switching operation. In addition, a reference numeral 75 denotes a correlation degree between the through image of the moving mage to be scanned after restart of capturing of the moving image and the semi-transfer image of the previous moving image.

In the meantime, according to the example shown in FIG. 11, the moving images 71, 73, and the semi-transfer images 72 and 74 denote two dancing persons, and in the FIG. 75, an oblique line denotes a ratio of correlation. In addition, the numeric value "80%" represents the correlation degree. The correlation degree may be displayed by a figure such as a graph, it may merely display the numeric value, or as the example shown in the drawing, the figure and the numeric value may be displayed together.

In addition, according to the above-described first and second embodiments, it is assumed that, in the moving image capturing mode, capturing of the moving image is started with the shutter key 9 "half-pressed" and it is terminated with the shutter key 9 "completely pressed". However, providing a moving image capturing start/end button on the digital camera 100, if the moving image capturing start/end button is pressed down in the moving image capturing mode, capturing of the moving image is started, and if the moving image capturing start/end button is pressed down once again, capturing of the moving image may be terminated.

In addition, according to the above-described first and second embodiments, a dedicated button for switching the mode (the mode switching button 8) is provided on the digital camera 100, however, without providing the dedicated button, other button may be used in place of this. In addition, by using a remote controlled capturing instruction device such as an infrared remote controller, the mode may be switched.

In addition, according to the above-described first and second embodiments, the mode switching operation is carried out when capturing of the still image is returned to capturing of the moving image, however, the present invention is not limited to this. For example, the number of filmed still images Is made to be set in advance and when the still images of the set number are filmed, the capturing may be returned to capturing of the moving image.

In addition, according to the above-described respective descriptions, the digital camera is taken as an example, however, the present invention is available to a cellular phone provided with a camera. However, In the case where the shutter operation uses the cellular phone provided with the camera, it is defined that the "half pressing down of the shutter key 9" and the "complete pressing down of the shutter key 9"

shown in FIGS. 6 to 8, and FIG. 10 are replaced with the "pressing down of the shutter key 9".

Some embodiments according to the present invention are described as above, however, the present invention is not limited to the above-described respective embodiments and it is obvious that various modifications thereof are available. For example, a word of "image capture apparatus" can be also applied to an information device having an imaging section in addition to the digital camera and the cellular phone provided with the camera.

What is claimed is:

1. An image capture apparatus comprising:
   an image capturing section for capturing a moving image and a still image via a common lens;
   a display section for displaying the moving image captured by the image capturing section as a through image;
   a capturing mode switching section for switching an image capturing mode between a moving image capturing mode in which moving image data representing the moving image captured by the image capturing section is stored and a still image capturing mode in which still image data representing the still image captured by the image capturing section is stored;
   a first retaining section for retaining field angle information from just before a time at which the image capturing mode is switched from the moving image capturing mode to the still image capturing mode by the capturing mode switching section;
   a second retaining section for retaining the moving image data captured by the image capturing section just before the time at which the image capturing mode is switched from the moving image capturing mode to the still image capturing mode by the capturing mode switching section;
   a field angle control section for controlling a field angle of the image capturing section to be a field angle represented by the field angle information retained by the first retaining section when the still image capturing mode is switched to the moving image capturing mode by the capturing mode switching section;
   an image generating section for generating a framing image based on the moving image data retained by the second retaining section when the still image capturing mode is switched to the moving image capturing mode by the capturing mode switching section; and
   a first display control section for displaying the framing image generated by the image generating section and the through image in a superimposed manner when the still image capturing mode is switched to the moving image capturing mode by the capturing mode switching section.

2. The image capture apparatus according to claim 1, further comprising:
   a shutter key configured to respond to a half-pressed operation for focusing and a completely-pressed operation for recording the still image data representing the still image captured by the image capturing section; and
   a second display control section configured to end the display of the framing image when the half-pressed operation is performed at the shutter key.

3. The image capture apparatus according to claim 1, wherein the moving image data representing the moving image captured by the image capturing section before the image capturing mode is switched from the moving image capturing mode to the still image capturing mode by the capturing mode switching section is stored after the image capturing mode is switched from the moving image capturing mode to the still image capturing mode by the capturing mode switching section.

4. The image capture apparatus according to claim 1, further comprising:
   a voice recording section configured to record a voice when the moving image is captured by the image capturing section,
   wherein the voice recording section is configured to continue a voice recording operation after the moving image capturing mode is switched to the still image capturing mode by the capturing mode switching section.

5. The image capture apparatus according to claim 1, wherein the image generating section is configured to generate a semi-transfer image from the moving image data retained in the second retaining section as the framing image.

6. The image capture apparatus according to claim 1, wherein the image generating section is configured to generate a contour image based on contour data extracted from the moving image data retained in the second retaining section as the framing image.

7. The image capture apparatus according to claim 1, wherein the image generating section is configured to generate a monotone silhouette image from the moving image data retained in the second retaining section as the framing image.

8. A non-transitory computer-readable recording medium having a computer program stored thereon that is executable by a computer of an apparatus comprising an image capturing section for capturing a moving image and a still image via a common lens, a display section for displaying the moving image captured by the image capturing section as a through image, and a capturing mode switching section for switching an image capturing mode between a moving image capturing mode in which moving image data representing the moving image captured by the image capturing section is stored and a still image capturing mode in which still image data representing the still image captured by the image capturing section is stored, said program causing the computer to execute functions comprising:
   retaining field angle information from just before a time at which the image capturing mode is switched from the moving image capturing mode to the still image capturing mode by the capturing mode switching section;
   retaining the moving image data captured by the image capturing section just before the time at which the image capturing mode is switched from the moving image capturing mode to the still image capturing mode by the capturing mode switching section;
   controlling a field angle of the image capturing section to be a field angle represented by the retained field angle information when the still image capturing mode is switched to the moving image capturing mode by the capturing mode switching section;
   generating a framing image based on the retained moving image data when the still image capturing mode is switched to the moving image capturing mode by the capturing mode switching section; and
   displaying the generated framing image and the through image in a superimposed manner when the still image capturing mode is switched to the moving image capturing mode by the capturing mode switching section.

9. An image capturing method for an image capture apparatus which comprises an image capturing section for capturing a moving image and a still image via a common lens, a display section for displaying the moving image captured by the image capturing section as a through image, and a capturing mode switching section for switching an image capturing mode between a moving image capturing mode in which moving image data representing the moving image captured by the image capturing section is stored and a still image capturing mode in which still image data representing the still image captured by the image capturing section is stored, the method comprising:
- retaining field angle information from just before a time at which the image capturing mode is switched from the moving image capturing mode to the still image capturing mode by the capturing mode switching section;
- retaining the moving image data captured by the image capturing section just before the time at which the image capturing mode is switched from the moving image capturing mode to the still image capturing mode by the capturing mode switching section;
- controlling a field angle of the image capturing section to be a field angle represented by the retained field angle information when the still image capturing mode is switched to the moving image capturing mode by the capturing mode switching section;
- generating a framing image based on the retained moving image data when the still image capturing mode is switched to the moving image capturing mode by the capturing mode switching section; and
- displaying the generated framing image and the through image in a superimposed manner when the still image capturing mode is switched to the moving image capturing mode by the capturing mode switching section.

10. An image capture apparatus comprising:
- an image capturing section for capturing a moving image and a still image via a common lens;
- a display section for displaying the moving image captured by the image capturing section as a through image;
- a capturing mode switching section for switching an image capturing mode between a moving image capturing mode in which moving image data representing the moving image captured by the image capturing section is stored and a still image capturing mode in which still image data representing the still image captured by the image capturing section is stored;
- a first retaining section for retaining field angle information from just before a time at which the image capturing mode is switched from the moving image capturing mode to the still image capturing mode by the capturing mode switching section;
- a second retaining section for retaining the moving image data captured by the image capturing section just before the time at which the image capturing mode is switched from the moving image capturing mode to the still image capturing mode by the capturing mode switching section;
- a field angle control section for controlling a field angle of the image capturing section to be a field angle represented by the field angle information retained by the first retaining section when the still image capturing mode is switched to the moving image capturing mode by the capturing mode switching section;
- a calculation section for calculating a correlation degree between the moving image data retained in the second retaining section and moving image data representing the moving image captured by the image capturing section when the still image capturing mode is switched to the moving image capturing mode by the capturing mode switching section; and
- a display control section for displaying the correlation degree calculated by the calculation section and the through image in a superimposed manner when the still image capturing mode is switched to the moving image capturing mode by the capturing mode switching section.

11. The image capture apparatus according to claim 10, wherein the moving image data representing the moving image captured by the image capturing section before the image capturing mode is switched from the moving image capturing mode to the still image capturing mode by the capturing mode switching section is stored after the image capturing mode is switched from the moving image capturing mode to the still image capturing mode by the capturing mode switching section.

12. The image capture apparatus according to claim 10, further comprising:
- a voice recording section configured to record a voice when the moving image is captured by the image capturing section,
- wherein the voice recording section is configured to continue a voice recording operation after the moving image capturing mode is switched to the still image capturing mode by the capturing mode switching section.

13. An image capture system including an image capture apparatus and an attitude control apparatus for adjusting an attitude of the image capture apparatus, the image capture apparatus comprising:
- an image capturing section for capturing a moving image and a still image;
- a capturing mode switching section for switching an image capturing mode between a moving image capturing mode in which moving image data representing the moving image captured by the image capturing section is stored and a still image capturing mode in which still image data representing the still image captured by the image capturing section is stored;
- a first retaining section for retaining field angle information from just before a time at which the image capturing mode is switched from the moving image capturing mode to the still image capturing mode by the capturing mode switching section;
- a second retaining section for retaining the moving image data captured by the image capturing section just before the time at which the image capturing mode is switched from the moving image capturing mode to the still image capturing mode by the capturing mode switching section;
- a field angle control section for controlling a field angle of the image capturing section to be a field angle represented by the field angle information retained by the first retaining section when the still image capturing mode is switched to the moving image capturing mode by the capturing mode switching section;
- a calculation section for calculating a correlation degree between the moving image data retained in the second retaining section and moving image data representing the moving image captured by the image capturing section when the still image capturing mode is switched to the moving image capturing mode by the capturing mode switching section; and
- a transmission section for transmitting a correlation degree signal representing a correlation degree calculated by the calculation section to the attitude control apparatus,
- wherein the attitude control apparatus is configured to adjust the attitude of the image capture apparatus so that the correlation degree calculated by the calculation section has a maximum value based on the correlation degree signal transmitted from the transmission section.

14. A non-transitory computer-readable recording medium having a computer program stored thereon that is executable by a computer of an apparatus comprising an image capturing section for capturing a moving image and a still image via a common lens, a display section for displaying the moving image captured by the image capturing section as a through image, and a capturing mode switching section for switching an image capturing mode between a moving image capturing mode in which moving image data representing the moving image captured by the image capturing section is stored and a still image capturing mode in which still image data representing the still image captured by the image capturing section is stored, said program causing the computer to execute functions comprising:

retaining field angle information from just before a time at which the image capturing mode is switched from the moving image capturing mode to the still image capturing mode by the capturing mode switching section;

retaining the moving image data captured by the image capturing section just before the time at which the image capturing mode is switched from the moving image capturing mode to the still image capturing mode by the capturing mode switching section;

controlling a field angle of the image capturing section to be a field angle represented by the retained field angle information when the still image capturing mode is switched to the moving image capturing mode by the capturing mode switching section;

calculating a correlation degree between the retained moving image data and moving image data representing the moving image captured by the image capturing section when the still image capturing mode is switched to the moving image capturing mode by the capturing mode switching section; and displaying the calculated correlation degree and the through image in a superimposed manner when the still image capturing mode is switched to the moving image capturing mode by the capturing mode switching section.

15. An image capturing method for an image capture apparatus which comprises an image capturing section for capturing a moving image and a still image via a common lens, a display section for displaying the moving image captured by the image capturing section as a through image, and a capturing mode switching section for switching an image capturing mode between a moving image capturing mode in which moving image data representing the moving image captured by the image capturing section is stored and a still image capturing mode in which still image data representing the still image captured by the image capturing section is stored, the method comprising:

retaining field angle information from just before a time at which the image capturing mode is switched from the moving image capturing mode to the still image capturing mode by the capturing mode switching section;

retaining the moving image data captured by the image capturing section just before the time at which the image capturing mode is switched from the moving image capturing mode to the still image capturing mode by the capturing mode switching section;

controlling a field angle of the image capturing section to be a field angle represented by the retained field angle information when the still image capturing mode is switched to the moving image capturing mode by the capturing mode switching section;

calculating a correlation degree between the retained moving image data and moving image data representing the moving image captured by the image capturing section when the still image capturing mode is switched to the moving capturing mode by the capturing mode switching section; and displaying the calculated correlation degree and the through image in a superimposed manner when the still image capturing mode is switched to the moving image capturing mode by the capturing mode switching section.

\* \* \* \* \*